United States Patent
Hillan et al.

(10) Patent No.: US 8,989,658 B2
(45) Date of Patent: Mar. 24, 2015

(54) METHODS AND APPARATUSES FOR IMPROVING NFC PARAMETER UPDATE MECHANISMS

(75) Inventors: John Hillan, Farnborough (GB); Jeremy R. O'Donoghue, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 13/483,763

(22) Filed: May 30, 2012

(65) Prior Publication Data

US 2012/0329393 A1     Dec. 27, 2012

Related U.S. Application Data

(60) Provisional application No. 61/500,803, filed on Jun. 24, 2011.

(51) Int. Cl.
*H04B 5/00*     (2006.01)
*H04W 28/18*     (2009.01)
*H04W 4/00*     (2009.01)

(52) U.S. Cl.
CPC ............. *H04W 28/18* (2013.01); *H04W 4/008* (2013.01)
USPC ....................................... 455/41.1

(58) Field of Classification Search
USPC ................. 455/39, 41.1, 41.2, 41.3
See application file for complete search history.

(56) References Cited

U.S. PATENT DOCUMENTS

| 7,174,157 B2 | 2/2007 | Gassho et al. |
| 8,106,749 B2 | 1/2012 | Ina et al. |
| 2005/0077356 A1 | 4/2005 | Takayama et al. |
| 2008/0207128 A1 | 8/2008 | Mikko |
| 2010/0130240 A1* | 5/2010 | Hart ................................ 455/509 |
| 2012/0045989 A1* | 2/2012 | Suumaki et al. ............. 455/41.1 |

FOREIGN PATENT DOCUMENTS

| EP | 2365676 A1 | 9/2011 |
| WO | 2010008251 A2 | 1/2010 |
| WO | 2010011055 A2 | 1/2010 |

OTHER PUBLICATIONS

International Search Report and Written Opinion—PCT/US2012/043874—ISA/EPO—Sep. 27, 2012.

* cited by examiner

*Primary Examiner* — Nguyen Vo

(74) *Attorney, Agent, or Firm* — Charles E. Eggers

(57) ABSTRACT

Aspects relate to improved mechanisms for updating parameter values for communications between a DH and a remote NFC endpoint. In one example, a DH associated with a NFC device may be configured to determine that one or more parameter values included in a parameter selection request message are different than one or more corresponding parameter values used during discovery of a remote NFC endpoint using a frame RF interface, and communicate the parameter values to a NFC Controller using a parameter update message. A NFCC associated with a NFC device may be configured to receive, using a NFC-DEP interface, a parameter selection request message including one or more parameters, determine to implement one or more parameter changes based on the received one or more parameters, and communicate an activation message to a DH indicating values to which the NFC Controller changed the one or more parameter values.

28 Claims, 12 Drawing Sheets

METHODS AND APPARATUSES FOR IMPROVING NFC PARAMETER UPDATE MECHANISMS

CLAIM OF PRIORITY UNDER 35 U.S.C. §119

The present application for patent claims priority to Provisional Application No. 61/500,803 entitled "Methods and Apparatus for Improving NFC Parameter Update mechanisms" filed Jun. 24, 2011, and assigned to the assignee hereof and hereby expressly incorporated by reference herein.

BACKGROUND

1. Field

The disclosed aspects relate generally to communications between devices and specifically to methods and systems for improving mechanisms for prompting a Near Field Communication (NFC) controller (NFCC) to update parameter values for peer-to-peer communications between a device host (DH) and a remote NFC endpoint.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When NFC is implemented, a NFC enabled device may initially detect a NFC tag and/or target device. Thereafter, communications between peer NFC devices may use a NFC data exchange protocol (NFC-DEP) communication link. Currently, the NFC Forum Controller Interface ("NCI") specification does not address all functionality required in order to create an NFC-DEP communication link.

For example, the Activity specification defines a mechanism for changing the bit rate as part of the Device Activation process, however, when a Peer to Peer Target uses a NCI Frame radio frequency (RF) Interface, the DH can interpret the message that bit rate may change, while a NFCC may not. There is currently no mechanism for the DH to inform the NFCC that the bit rate must be changed for subsequent peer-to-peer communications. Still further, there is no mechanism to change a buffer size, which may occur with a change in bit rate. In another example, when a NCI NFC-DEP RF interface is used, the current specification does not clearly indicate operations for link creation.

Thus, improved apparatuses and methods for providing improved mechanisms for updating parameter values for peer-to-peer communications between a DH and a remote NFC endpoint using interfaces such as a frame RF interface and a NFC-DEP RF interface may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with providing improved mechanisms for updating parameter values for peer-to-peer communications between a DH and a remote NFC endpoint. In one example, a DH associated with a NFC device may be configured to determine that one or more parameter values included in a parameter selection request message are different than one or more corresponding parameter values used during discovery of a remote NFC endpoint using a frame RF interface. The DH may be also configured to communicate the one or more parameter values to a NFC Controller using a parameter update message. In another example, a NFCC associated with a NFC device may be configured to receive, using a NFC-DEP interface, a parameter selection request message including one or more parameter values. The NFCC may be further configured to determine to implement one or more parameter changes based on the received one or more parameter values. The NFCC may also be configured to communicate an activation message to a DH indicating values to which the NFC Controller changed the one or more parameter values.

According to related aspects, a method for providing improved mechanisms for updating parameter values for peer-to-peer communications between a DH and a remote NFC endpoint is described. The method can include determining, by a DH, that one or more parameter values included in a parameter selection request message are different than one or more corresponding parameter values used during discovery of a remote NFC endpoint using a frame RF interface. The method can also include communicating the one or more parameter values to a NFC Controller using a parameter update message, wherein the parameter update message prompts the NFC Controller to change the one or more corresponding parameter values used during discovery to the one or more parameter values included in the parameter selection request message.

Another aspect relates to a communications apparatus. The communications apparatus can include means for determining, by a DH, that one or more parameter values included in a parameter selection request message are different than one or more corresponding parameter values used during discovery of a remote NFC endpoint using a frame RF interface. The communications apparatus can also include means for communicating the one or more parameter values to a NFC Controller using a parameter update message, wherein the parameter update message prompts the NFC Controller to change the one or more corresponding parameter values used during discovery to the one or more parameter values included in the parameter selection request message.

Another aspect relates to a communications apparatus. The apparatus can include a DH configured to determine that one or more parameter values included in a parameter selection request message are different than one or more corresponding parameter values used during discovery of a remote NFC endpoint using a frame RF interface. The DH may be further configured to communicate the one or more parameter values to a NFC Controller using a parameter update message, wherein the parameter update message prompts the NFC Controller to change the one or more corresponding parameter values used during discovery to the one or more parameter values included in the parameter selection request message.

Another aspect relates to a computer program product, which can have a computer-readable medium comprising code for determining, by a DH, that one or more parameter values included in a parameter selection request message are different than one or more corresponding parameter values used during discovery of a remote NFC endpoint using a frame RF interface. The computer-readable medium can also include code for communicating the one or more parameter values to a NFC Controller using a parameter update message, wherein the parameter update message prompts the NFC Controller to change the one or more corresponding parameter values used during discovery to the one or more parameter values included in the parameter selection request message.

According to related aspects, another method for providing improved mechanisms for updating parameter values for peer-to-peer communications between a DH and a remote NFC endpoint is described. The method can include receiving, by a NFC Controller using a NFC-DEP interface, a parameter selection request message including one or more parameter values. Further, the method can include determining to implement one or more parameter changes based on the received one or more parameter values. The method can also include communicating an activation message to a DH indicating values to which the NFC Controller changed the one or more parameter values.

Another aspect relates to a communications apparatus. The communications apparatus can include means for receiving, by a NFC Controller using a NFC-DEP interface, a parameter selection request message including one or more parameter values. Further, the communications apparatus can include means for determining to implement one or more parameter changes based on the received one or more parameter values. The communications apparatus can also include means for communicating an activation message to a DH indicating values to which the NFC Controller changed the one or more parameter values.

Another aspect relates to a communications apparatus. The apparatus can include a NFCC configured to receive, using a NFC-DEP interface, a parameter selection request message including one or more parameter values. The NFCC may also be configured to determine to implement one or more parameter changes based on the received one or more parameter values. The NFCC may be further configured to communicate an activation message to a DH indicating values to which the NFC Controller changed the one or more parameter values.

Another aspect relates to a computer program product, which can have a computer-readable medium comprising code for receiving, by a NFC Controller using a NFC-DEP interface, a parameter selection request message including one or more parameter values. The computer-readable medium can include code for determining to implement one or more parameter changes based on the received one or more parameter values. The computer-readable medium can also include code for communicating an activation message to a DH indicating values to which the NFC Controller changed the one or more parameter values.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link (e.g., a NFC-DEP based communications link). As described herein, communications between the devices may be enabled over a variety of NFC RF technologies, such as but not limited to, NFC-A, NFC-B, NFC-F, etc. Further, different NFC technologies may be enabled during different phases of communications (e.g., an activation phase, a data exchange phase, etc.) Still further, different bit rates may be used at different phases of communications.

As described herein, NCI Command and Response messages are presented which may be used by the DH to update certain RF Communication parameter values as part of an RF Interface activation procedure. Further, example tables including normative text for the parameter values in the Command and Response are provided. This submission includes text which clarifies the activation procedure both for Frame and NFC-DEP RF Interfaces. Changes and/or additions to the current standard are included for the activation procedure for both polling devices and listening devices and for both RF Interfaces (e.g., Frame and NFC-DEP).

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
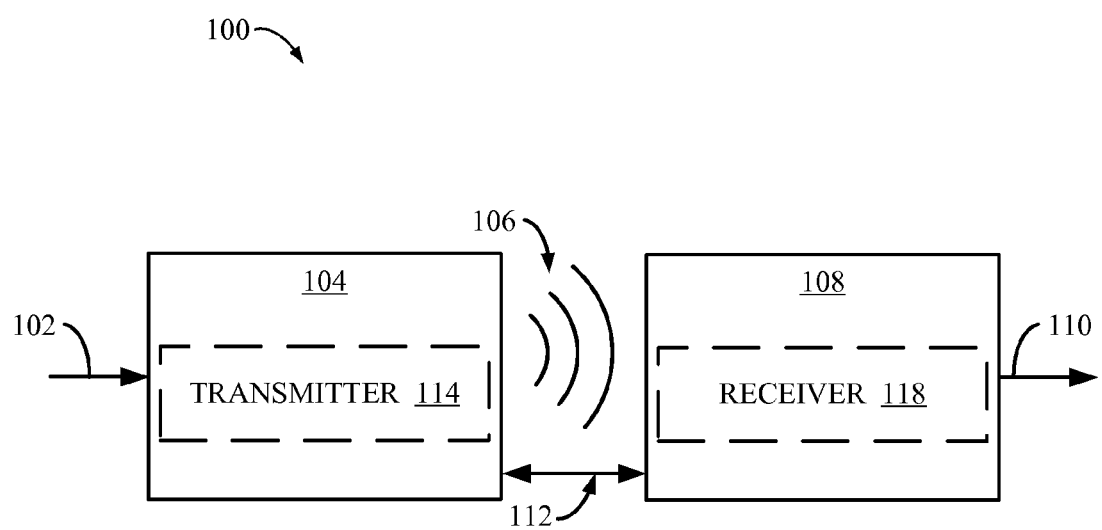
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
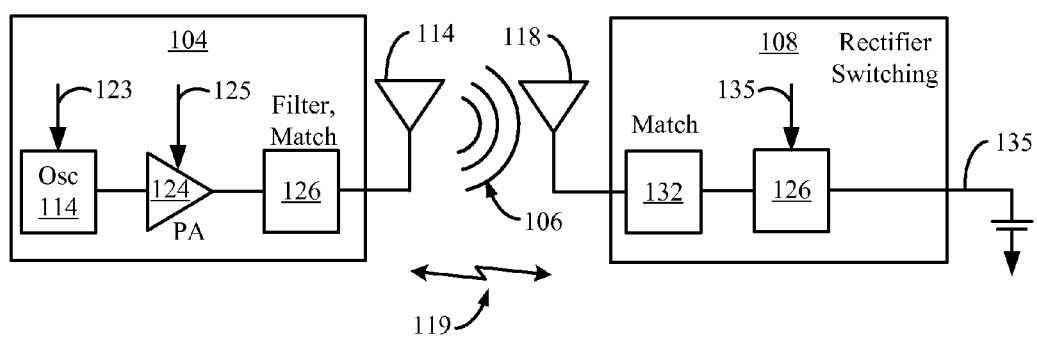
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 119 (e.g., Bluetooth, zigbee, cellular, etc).

Figure 3:
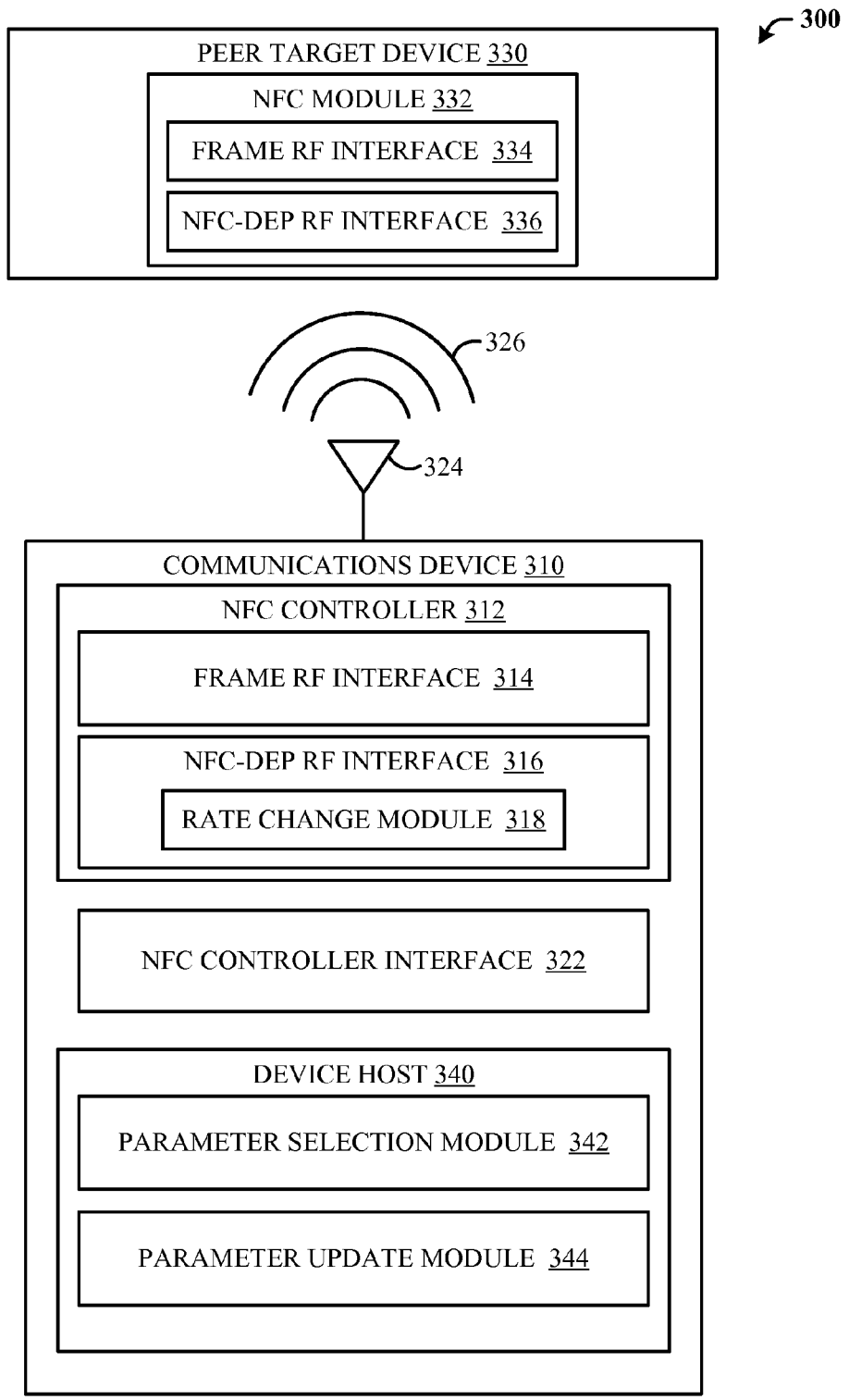
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may be in communication with a peer target device 330 using one or more NFC technologies 326 (e.g., NFC-A, NFC-B, NFC-F, etc.). In an aspect, peer target device 330 may be configured to communicate using NFC module 332 using various interfaces, such as frame RF interface 334 and NFC-DEP interface 336. In another aspect, communications device 310 and peer target device 330 may establish a peer-to-peer communication link using NRC-DEP. In still another aspect, communications device 310 may be configured to be connected to an access network and/or core network (e.g., a CDMA network, a GPRS network, a UMTS network, and other types of wireline and wireless communication networks).

In an aspect, communications device 310 may include a NFC controller 312, a NFC controller interface (NCI) 322, and device host 340. In an aspect, NFC Controller 312 may be configured to obtain, through NCI 322, information from peer target device 330, through peer target device NFC module 332. During peer-to-peer communications NFC Controller 312 may operate using a frame RF interface 314 or a NFC-DEP interface 316. When operating using the NFC-DEP interface 316, NFC Controller 312 may be configured to change various parameter values associated with communications between device host 340 and peer target device 330 using rate change module 318. Device host 340 may include, among other modules, parameter selection module 342 and parameter update module 344.

In an operational aspect, when using a frame RF interface 314, NFC Controller 312 may act as a relay and merely communicate messages between communications device 310 device host 340 and peer target device 330. In such an aspect, NFC controller 312 may not interpret the content of messages relayed between communications device 310 device host 340 and peer target device 330. For example, when using frame RF interface 314, the NFC Controller cannot interpret a PSL_REQ, and thus cannot update the communication parameter values included within the PSL_REQ. In such an aspect, device host 340 may determine that a bit rate change may be requested through parameter selection module 342. Parameter selection module 342 may receive a parameter selection request (e.g., PSL_REQ) message from peer target device 330. Parameter update module 344 may communicate a selection of parameter values obtained by parameter selection module 342 to NFC Controller 312. Further, communications from parameter update module 344 may prompt NFC controller 312 to change various parameters, such as receive and/or transmit data rates, bit rate, RF technology, buffer size, maximum payload size, etc.

The parameter selection request message may include parameters, such as but not limited to, device identifier (DID), data rate received by initiator (DRI), data rate sent by initiator (DSI), maximum value of the frame length (FSL), etc. As NFC Controller 312 may not detect the content of the parameter selection request, device host 340 may communicate the necessary parameter values using parameter update module 344. Parameter update module 344 may use messaging as defined in Tables 1, 2 and 3.

TABLE 1

Control Message for Parameter Update Request
RF_PARAMETER_UPDATE_CMD

| Payload Field(s) | Length | Value/Description | |
|---|---|---|---|
| Number of Parameters | 1 Byte | The number of RF Communication Parameter fields to follow (n). | |
| RF Communication Parameter [1 . . . n] | x + 2 Bytes | ID 1 Byte | The identifier of the RF Communication Parameter as defined in Table 3. |
| | | Length 1 Byte | The length of Value (x). |
| | | Value x Bytes | Value of the RF Communication Parameter. |

TABLE 2

Control Message for Parameter Update Response
RF_PARAMETER_UPDATE_RSP

| Payload Field(s) | Length | Value/Description |
|---|---|---|
| Status | 1 Byte | See Table 89 |
| Number of Parameters | 1 Byte | The number of RF Communication Parameter ID fields to follow (n). Value SHALL be 0 and no Parameter IDs listed unless Status = STATUS_INVALID_PARAM. |
| RF Communication Parameter ID [0 . . . n] | 1 Byte | The identifier of the invalid RF Communication Parameter. See Table B for a list of IDs. |

TABLE 3

Type Length Value (TLV) Coding for RF Communication Parameter ID

| Type | Length | Value |
|---|---|---|
| 0x00 | 1 Byte | RF Technology and Mode, coded as defined in Table 52. |
| 0x01 | 1 Byte | Transmit Bit Rate, coded as defined in Table 91. |
| 0x02 | 1 Byte | Receive Bit Rate, coded as defined in Table 91. |
| 0x03 | 1 Byte | Maximum Payload Size. |
| 0x04-0x7F | | Reserved for future use |
| 0x80-0xFF | | Proprietary |

As used herein, with reference to Tables 1-3, there may be situations in which the DH 340 may attempt to communicate updates of certain RF Communication parameter values in the NFC Controller 312 after RF Discovery has begun. During such situations, the DH 340 sends a parameter update command (e.g., RF_PARAMETER_UPDATE_CMD) to NFC Controller 312. Table 1 provides an example parameter update command. This command may be used in any RF Communication state. In operation, not all RF Communication parameter settings may be permissible in all modes of operation. As such, the DH 340 takes responsibility for ensuring values sent to the NFC Controller 312 are correct. In other words, in the above described aspect, there is no obligation for the NFC Controller 312 to check whether a given parameter value is permitted.

Continuing the above described operational aspect, with reference to Tables 2-4, when NFC Controller 312 receives the update command (e.g., RF_PARAMETER_UPDATE_CMD), the NFC Controller 312 responds with an update response (e.g., RF_PARAMETER_UPDATE_RSP).

Table 2 provides an example parameter update response. In Table 3, the "Status" field indicates whether the setting of these RF Communication parameter values was successful or not. For example, a "Status" of STATUS_OK SHALL indicates that all RF Communication parameter values have been set within the NFC Controller 312 to values included in the parameter update command. By contrast, if the DH 340 tries to set a parameter which is not applicable for the NFC Controller 312, the NFC Controller 312 responds with a parameter update response (e.g., RF_PARAMETER_UPDATE_RSP) with a "Status" field of "invalid" (e.g., STATUS_INVALID_PARAM) and the response may include one or more invalid RF Communication parameter IDs. In an aspect, where some parameter values are invalid, the remaining valid parameter values are still used by the NFC Controller 312. Once NFC Controller 312 has communicated the parameter update response (e.g., RF_PARAMETER_UPDATE_RSP), the NFC Controller 312 uses the values of successfully updated parameter values.

Referring to Table 3, the "RF Technology and Mode" parameter specifies the RF Technology and Mode to be used by the NFC Controller 312 when transmitting and receiving. Permitted values of RF Technology and Mode for a given RF Interface activation may be found reference to the current standard (not included).

Referring to Table 3, the "Transmit Bit Rate" parameter specifies the bit rate to be used by the NFC Controller 312 when transmitting. For a polling device this is the polling device to listening device bite rate, and for a listening device this is the listening device to polling device bit rate. Permitted values of bit rate for a given RF Interface activation may be found reference to the current standard (not included).

Referring to Table 3, the "Receive Bit Rate" parameter specifies the bit rate to be used by the NFC Controller when receiving. For a polling device this is the listening device to polling device bit rate, and for a listening device this is the polling device to listening device bite rate. Permitted values of bit rate for a given RF Interface activation may be found reference to the current standard (not included).

Referring to Table 3, the "Maximum Payload Size" parameter specifies the maximum number of payload bytes for use by the NFC Controller 312 when transmitting. In an aspect, The NFC Controller cannot send more than the number of payload bytes specified in "Maximum Payload Size" parameter to the peer target device 330 in a single transmission. In an aspect, a value 0 is to be interpreted by the NFC Controller 312 as meaning 256 bytes. Permitted values of maximum payload size for a given RF Interface activation may be found reference to the current standard (not included).

In another operational aspect, when NFC-DEP interface 316 is used to facilitate communications between communications device 310 device host 340 and peer target device 330, the NFC Controller 312 may interpret the content of the messages being conveyed. In such an aspect, NFC Controller 312. NFC Controller 312 may determine whether rate change module 318 may be used based on the presence or absence of a parameter selection message. When the device host 340 is in a polling mode, the device host 340 may transmit the parameter selection request message. When the device host 340 is in a listening mode, NFC Controller 312 may wait to determine whether a message received after an attribute message is a data exchange protocol (DEP) message or a parameter selection request message. When the message received is a parameter selection request message, NFC Controller 312 may interpret the content of the message to determine whether parameter changes may be implemented using rate change module 318. Further, when the message is a parameter selection request message, NFC Controller 312 may communicate any updated parameter values to device host 340 using an activation notification message. By way of example and not in limitation, Table 5 provides an activation notification message that NFC controller 312 may generate.

TABLE 5

Example notification Message
RF_ACTIVATE_NTF

| Payload Field(s) | Length | Value/Description |
| --- | --- | --- |
| Target Handle | 1 Byte | |
| RF Protocol | 1 Byte | See Table 86. |
| Activation RF Technology and Mode | 1 Byte | RF Technology and Mode of the local device that were used for the collection of the RF Technology Specific Parameters below. See Table 50. |
| RF Technology Specific Parameters | 0-n Bytes | Depends on RF Technology and Mode. See Table 51 for NFC-A Poll Mode. See Table 52 for NFC-A Listen Mode. See Table 53 for NFC-B Poll Mode. See Table 54 for NFC-B Listen Mode. See Table 55 for NFC-F Poll Mode. See Table 56 for NFC-F Listen Mode. |
| Data Exchange RF Technology and Mode | 1 Byte | RF Technology that will be used for future Data Exchange. See Table 50. |
| Data Exchange Transmit Bit Rate | 1 Byte | Bit Rate that will be used for future Data Exchange in the poll->listener direction. |
| Data Exchange Receive Bit Rate | 1 Byte | Bit Rate that will be used for future Data Exchange in the listener->poll direction. |
| RF Interface Type | 1 Byte | See Table 87. |
| Activation Parameters | 0-n Bytes | Activation Parameters are defined on the RF Interface section identified by the RF Interface Type. |

As used herein, a poll mode may be defined as a mode during which the device is transmitting and a listener mode may be defined as a mode during which the device is available to receive communications. As noted above, the tables referred to in Table 5 correspond to tables described in a NFC standard (not included).

Referring to Table 5, depending on the selected Target Handle/RF Protocol, the NFC controller 312 may performs protocol activation procedures before activating an RF Interface. Protocol activation may be different for each RF Interface. Generally, the Target Handle value communicated in an RF_ACTIVATE_NTF is valid until the state is changed to an idle state (e.g., RFST_IDLE). When all phases before RF Interface activation are performed successfully, NFC controller 312 sends a notification (e.g., RF_ACTIVATE_NTF) with information about the activated RF Interface (RF Interface Type). NFC controller 312 may also include activation parameter values. Activation parameter values may be different for each RF Interface while other parameter values in a RF_ACTIVATE_NTF may be the same as those used in a RF_DISCOVER_NTF message. NFC controller 312 includes the RF Technology and Mode that was used during the activation process (e.g., Activation RF technology and Mode) in the notification. NFC controller 312 also includes any RF Technology Specific Parameter values that may have been gathered during the activation process. These included parameter values may be defined for the RF Technology and Mode value that was used during the activation process. If the RF Protocol is PROTOCOL_NFC_DEP or PROTOCOL_ISO_DEP the NFC controller 312 includes the bit rates for poll to listen and listen to poll that were established during activation, and the bit rates for poll to listen and listen to poll that will be used for subsequent Data Exchange. If the RF Protocol is other than PROTOCOL_NFC_DEP or PROTOCOL_ISO_DEP, the NFC controller 312 may include the bit rates for poll to listen and listen to poll that may be used for subsequent Data Exchange.

In one operational aspect, if the RF Protocol is PROTOCOL_NFC_DEP, the NFC controller 312 includes the RF Technology and Mode that was established during activation, and the RF Technology and Mode will be used for subsequent Data Exchange. Note that if the bit rate was changed during activation because of the value specified in BITR_NFC_DEP, the RF Technology and Mode may be different from the one that defines the nature of the RF Technology Specific Parameter values. If the RF Protocol determined to be something other than PROTOCOL_NFC_DEP, the NFC controller 312 may include a RF Technology and Mode value that may be used for subsequent Data Exchange. Further, the notification generated by NFC controller 312 may provide information to device host 340 with respect to selected receive and transmit data rates be used for subsequent data exchanges.

As such, communications system 300 provides an environment to allow updating of parameter values for peer-to-peer communications between a DH 340 and a remote NFC endpoint using interfaces.

FIGS. 4-9B illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
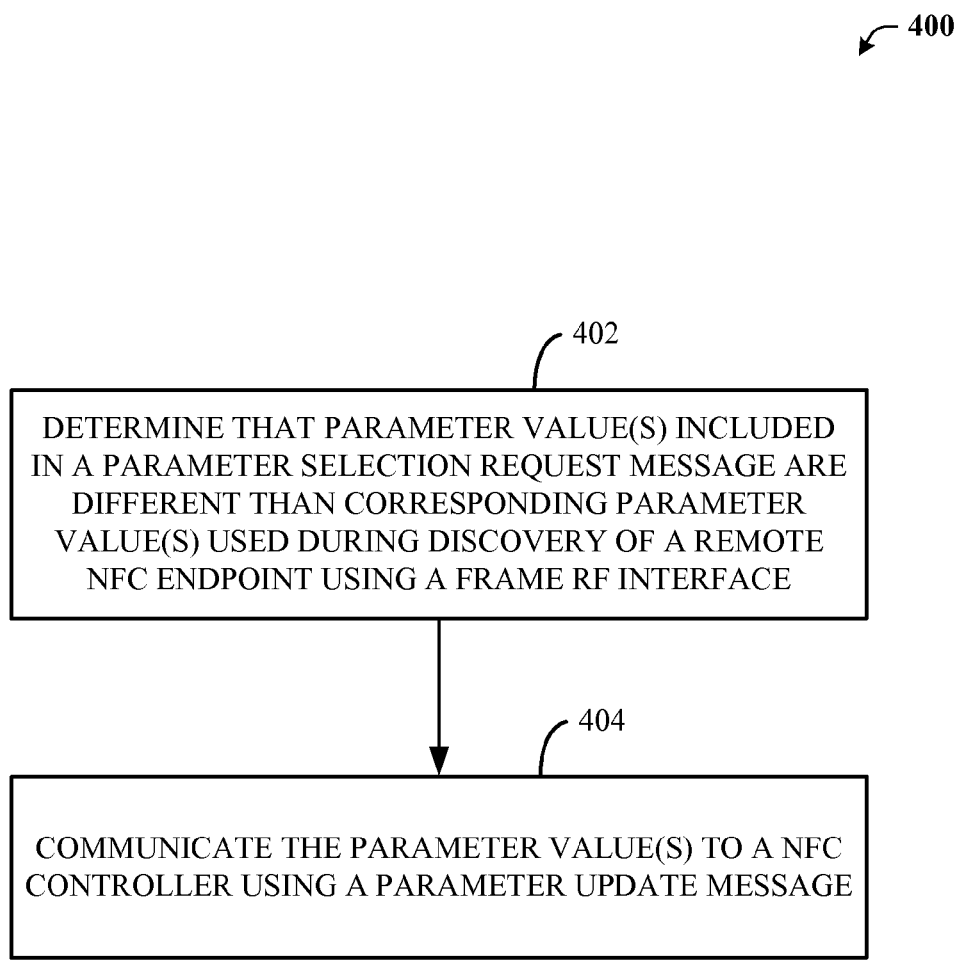
FIG. 4 is a flowchart describing an example for updating parameter values when a frame RF interface is used, according to an aspect.

With reference now to FIG. 4, an example flowchart describing a process 400 for updating parameter values for peer-to-peer communications between a DH and a remote NFC endpoint is illustrated.

At block 402, a DH associated with a communications device may determine that one or more parameter values included in a parameter selection request message are different than one or more corresponding parameter values used during discovery of a remote NFC endpoint using a frame radio frequency RF interface. In an aspect, where the DH is configured in a poll mode, the DH determination may further include receiving an activation notification message from the NFC Controller, and generating the parameter selection request message to change the one or more corresponding parameter values used during discovery to the one or more parameter values included in a parameter selection request message. In such an aspect, one or more parameter values included in a parameter selection request message may be different than the one or more corresponding parameter values used during discovery. In another aspect, wherein the DH is configured in a Listen Mode, the DH determination may be based on the parameter selection request message received from the remote NFC endpoint. In an aspect, parameter values may include a RF technology and mode parameter, a transmit bit rate parameter, a receive bit rate parameter, a maximum payload size parameter, etc. Further, in such an aspect, the RF technology and mode parameter may indicate use of a NFC-A technology, a NFC-B technology, a NFC-F technology, etc. In an aspect, the remote NFC device may be a remote NFC tag, a reader/writer device, a remote peer target device, etc.

At block 404, the DH may communicate the one or more parameter values to a NFC Controller using a parameter update message. In an aspect, the parameter update message may prompts the NFC Controller to change the one or more corresponding parameter values used during discovery to the one or more parameter values included in the parameter selection request message.

Figure 5:
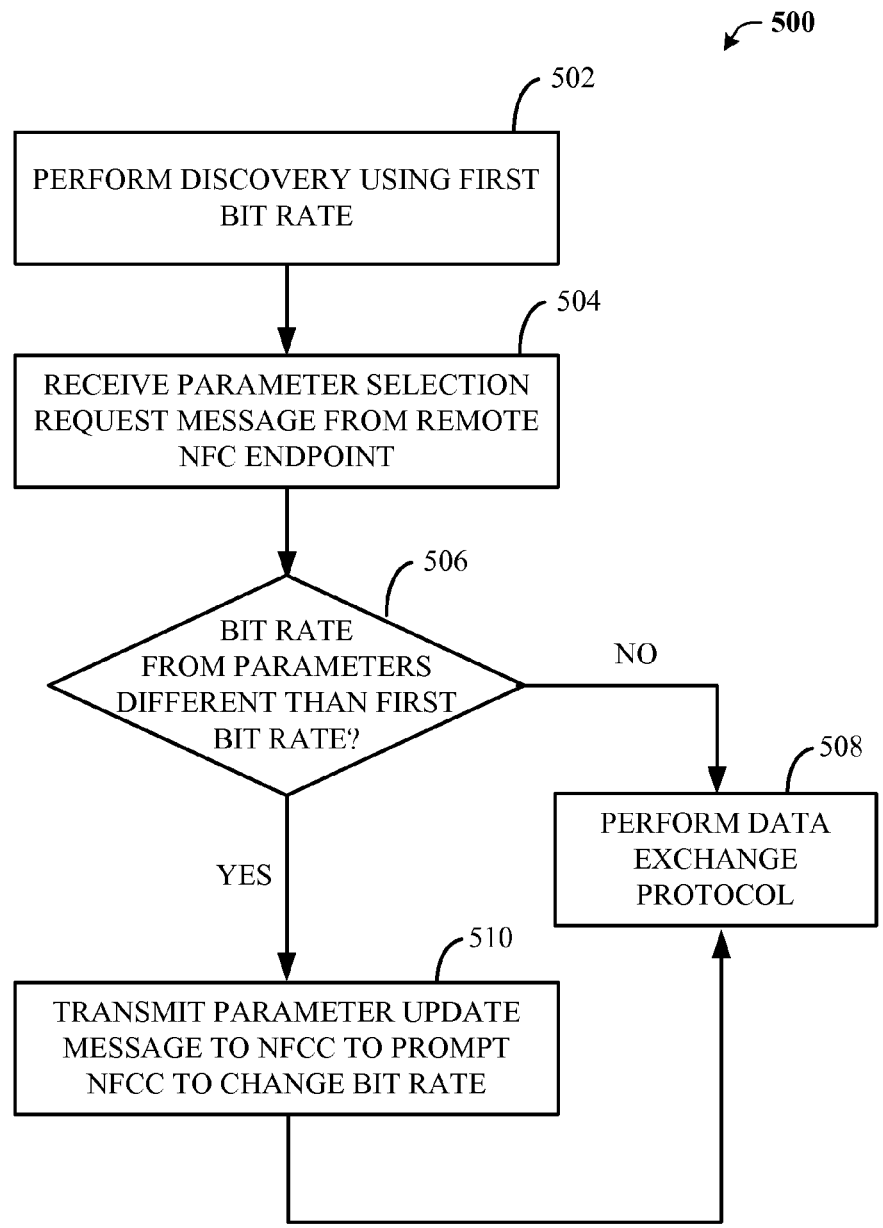
FIG. 5 is a flowchart describing another example for updating parameter values when a frame RF interface is used, according to an aspect.

With reference now to FIG. 5, an example flowchart describing another process 500 for updating parameter values for peer-to-peer communications between a DH and a remote NFC endpoint is illustrated.

At block 502, a discovery process may be performed. In an aspect, a device host may transmit a RF_DISCOVER_MAP to a NFC Controller indicates, among other items, a RF interface type to be used. (e.g., frame, NFC-DEP, etc.). Further, during discovery, the NFCC may communicate with a remote NFC endpoint. Communications may include sense requests and responses (e.g., SENS_REQ/RES), attribute requests and responses (e.g., ATR_REQ/RES), etc. In the aspect depicted in FIG. 5, the frame RF interface is enabled.

At block 504, the DH may receive a parameter selection request message from the remote NFC endpoint discovered during discovery. At block 506, DH may compare parameter values currently used by the DH with parameter values provided in the received parameter selection request message.

If at block 506 the DH determines that none of the parameter values are different, then at block 508 DH may initiate communications with the remote NFC endpoint using a DEP protocol. By contrast, if at block 506 the DH determines that one or more of the parameter values are different, then at block 512 the DH generates and transmits a parameter update message to the NFCC to prompt to the NFCC to update the currently used parameter values to those included in the parameter update message. In an aspect, the parameter update messages may be formatted using fields described in Tables 2-4. Once the NFCC has updated the one or more parameters, the process may continue to block 508 to allow the DH to initiate communications with the remote NFC endpoint using a DEP protocol.

Figure 6:
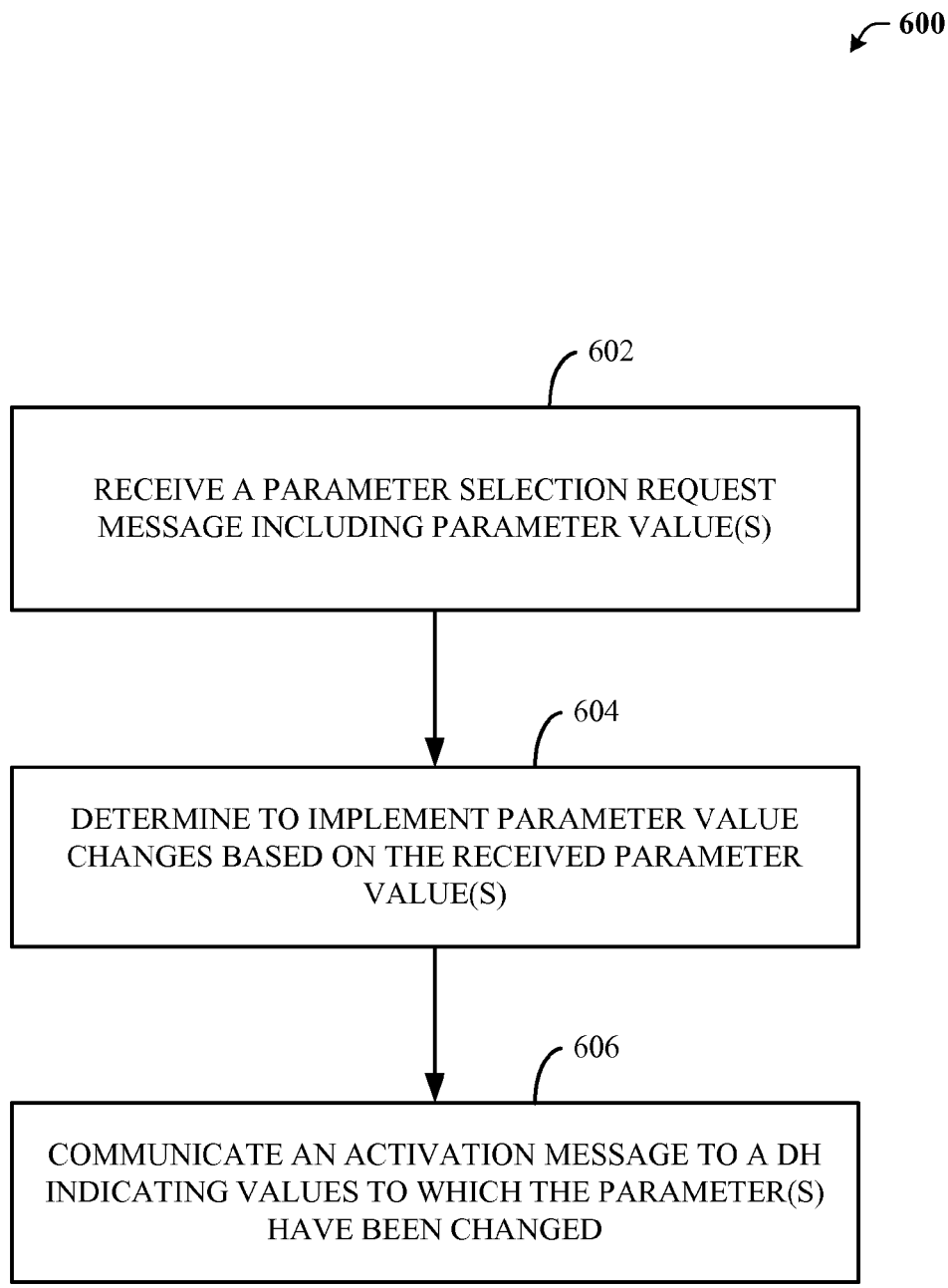
FIG. 6 is a flowchart describing an example system for updating parameter values when a NFC-DEP interface is used, according to an aspect.

With reference now to FIG. 6, another example flowchart describing a process 500 for updating parameter values for peer-to-peer communications between a DH and a remote NFC endpoint is illustrated.

At block 602, a NFC Controller associated with a communications device, using a NFC-DEP interface, may receive a parameter selection request message including one or more parameter values. In an aspect in which a DH is in a Poll Mode, the parameter selection request message may be received from the DH. In an aspect, the parameter values may include a RF technology and mode parameter, a transmit bit rate parameter, a receive bit rate parameter, a maximum payload size parameter, etc. Further, in such an aspect, the RF technology and mode parameter may indicate use of a NFC-A technology, a NFC-B technology, a NFC-F technology, etc.

At block 604, the NFC Controller may determine to implement one or more parameter changes based on the received one or more parameter values. In an aspect, where a DH is configured in a Listen Mode, the NFCC determination may include receiving attributes from a remote NFC endpoint, waiting for a message to be communicated by the remote NFC endpoint after the attributes, receiving the waited for message, determining the waited for message is the parameter selection request message, communicating an activation message to the DH including the one or more parameters, and transmitting a parameter selection response to the remote NFC endpoint. In an aspect, the remote NFC device may be a remote NFC tag, a reader/writer device, a remote peer target device, etc.

At block 606, the NFC Controller may communicate an activation message to a DH indicating values to which the NFC Controller changed the one or more parameter values. In an aspect, the NFC controller may further transmit a payload to the remote NFC endpoint using a NFC-DEP interface and using at least one of the one or more parameter values.

Figure 7:
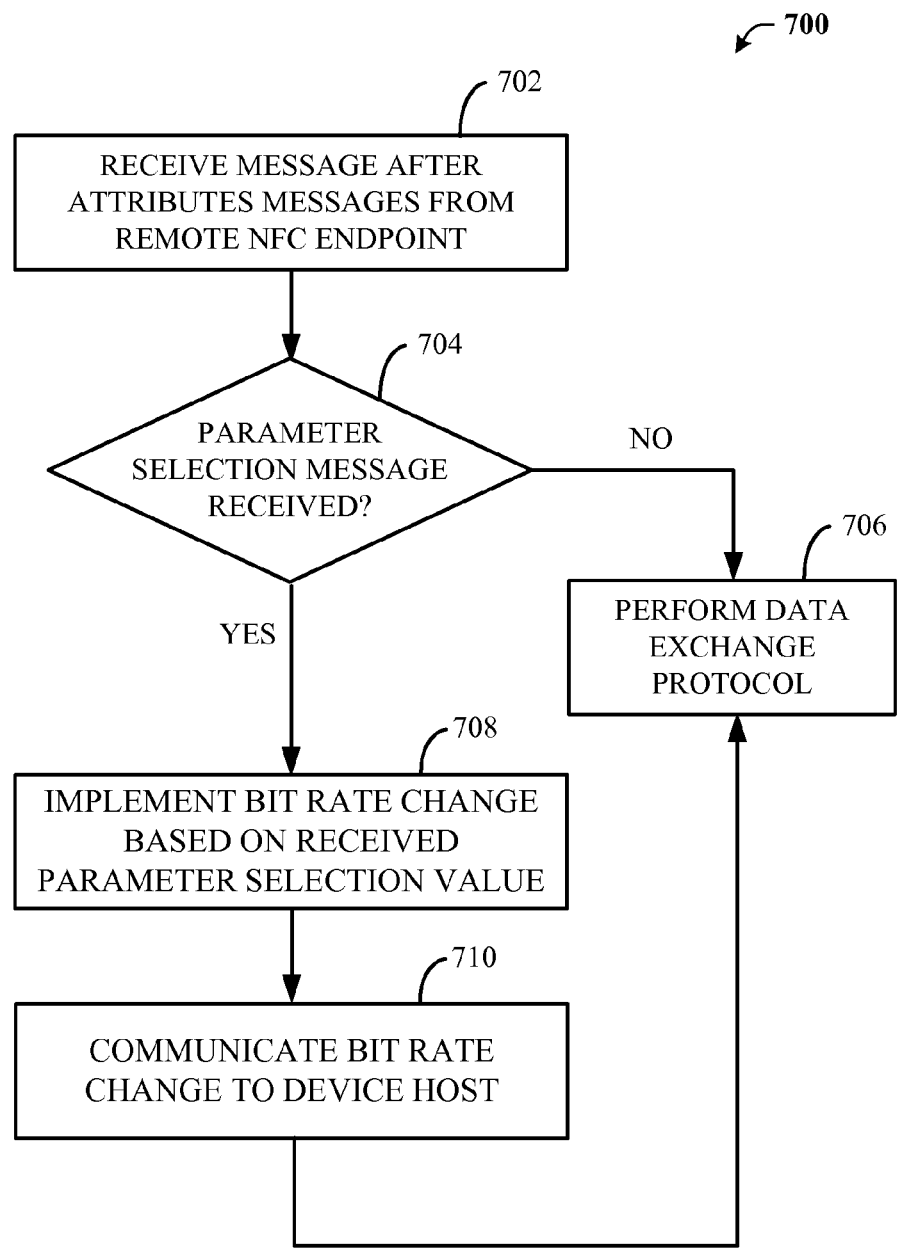
FIG. 7 is a flowchart describing another example system for updating parameter values when a NFC-DEP interface is used, according to an aspect.

With reference now to FIG. 7, another example flowchart describing another process 700 for updating parameter values for peer-to-peer communications between a DH and a remote NFC endpoint is illustrated. As discussed above, a discovery process may be implemented to locate a remote NFC endpoint. Once such a remote NFC endpoint is discovered various messages may be communicated between the remote NFC endpoint and the NFCC. In an aspect, these messages include sense commands (e.g., SENS_REQ), attribute commands (e.g., ATR_REQ), etc. Further, in the aspect depicted n FIG. 7, a NFC-DEP interface may be used.

At block 702, the NFCC may receive a message after receiving attributes associated with the remote endpoint. At block 704, because communicates are implemented using a NFC-DEP interface, the NFCC may it determine whether the received message is a parameter selection request message. If at block 704 it is determined that the message is not a parameter selection message, then at block 706 the NFCC may process the received message (e.g., a DEP request message) and perform DEP set up. By contrast, if at block 706 it is determined that the received message is a parameter selection request message, then at block 708, the NFCC may parse the received message to determine any differences between provided parameter values and currently used parameter values. If differences are found, the NFCC may change the parameter values to the received parameter value. At block 710, the NFCC uses an activation notification message to communicate the updated parameter values to a DH, and thereafter the NFCC may implement DEP set up at block 706 upon receipt of a DEP message.

Figure 8:
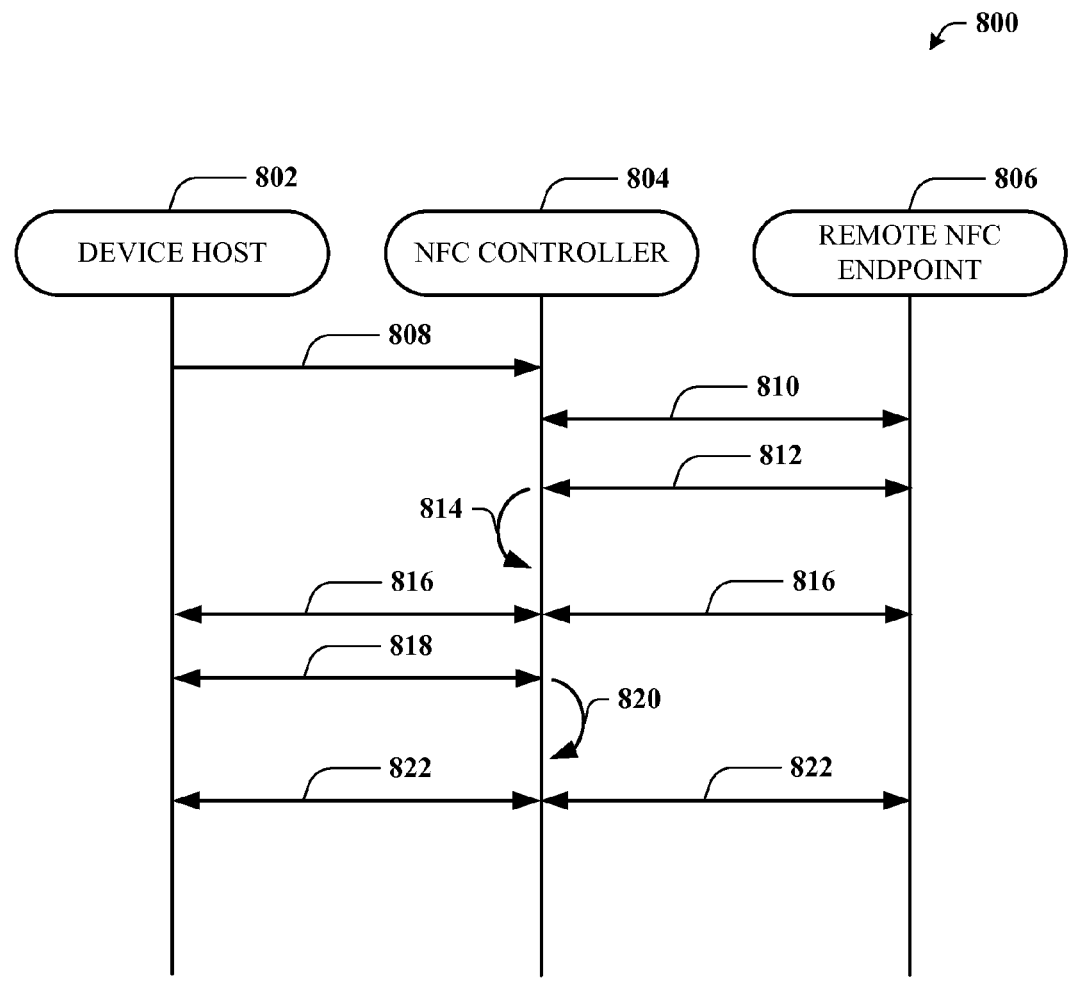
FIG. 8 is a call flow diagram describing an example for updating parameter values when a frame RF interface is used, according to an aspect.

With reference now to FIG. 8, an example call flow diagram describing a system for updating parameter values for peer-to-peer communications between a DH and a remote NFC endpoint using a NFCC is illustrated. As depicted in FIG. 8 a NFC environment 800 may include a device 802, a NFCC 804 and a remote NFC endpoint 806. Device host 802 may be implemented in Poll Mode or Listening Mode.

In an aspect, to enable Poll Mode, at act 808, the DH 802 may send a discovery message (e.g., RF_DISCOVER_CMD) to NFCC 804 indicating that discovery for Poll Mode should start. In another aspect, to enable Listen Mode, at act 808, the DH 802 may send a discovery message (e.g., RF_DISCOVER_CMD) to NFCC 804 indicating that discovery for listening devices should start. At act 810, sense request and response messages may be communicated between NFCC 804 and the remote NFC endpoint 806. In an aspect, multiple sense responses (e.g., SENSF_RESs) may be sent from one or more of the remote NFC endpoints 806 connected to the NFCC 804. In such an aspect, the NFCC 804 may assign a time slot to each SENSF_RES prior to sending them to the remote NFC endpoint 806. If multiple SENSF_RESs are sent to the remote NFC endpoint 806, the NFCC 804 may send the RF_ACTIVATE_NTF corresponding to the RF Protocol indicated by the RF Frame received after sending SENSF_RESs to the DH 802. At act 812, attribute request and response message may be communicated between NFCC 804 and the remote NFC endpoint 806. At act 814, the NFCC 804 establishes operability in a frame RF interface mode of operation. At act 816 parameter selection messages may be communicated between DH 802 and remote NFC endpoint 806 through NFCC 804.

In Poll Mode, when the NFCC is ready to exchange data (e.g., after receiving Poll Response(s) from Remote NFC Endpoints), at act 818, the NFCC 804 sends an activation message (e.g., RF_ACTIVATE_NTF) to the DH 802 to indicate that this Interface has been activated to be used with the specified remote NFC endpoint 806. In an aspect, where multiple remote NFC endpoints 806 are detected, the DH 802 may select one of the remote NFC endpoints 806 to be used. In an aspect in which a frame RF interface is in use, the activation is under the control of the DH 802. In such an aspect, RF Technologies are not included any Activation Parameter values in the RF_ACTIVATE_NTF message. By contrast, if the RF Protocol is NFC-DEP, the RF_ACTIVATE_NTF is sent following the exchange of ATR request and response and additional steps may be executed before data exchange can begin In Listen Mode, if a listening device DH 802 receives an activation notification (e.g., RF_ACTIVATE_NTF) that indicates that it has been activated by a remote NFC endpoint 806 that is a Peer to Peer Initiator, the DH 802 does not change the RF Communication parameter values before the arrival of the first Data Packet from the Initiator remote NFC endpoint. Further, if it interprets the first Data Packet as a well formed DEP_REQ, DH 802 does not change the RF Communication parameter values.

In Poll Mode if, at act 818, DH receives an RF_ACTIVATE_NTF indicating that it has activated a remote NFC endpoint that is a Peer to Peer Target, DH 802 determines whether RF Communication parameter values need to be updated. In Listen Mode, if DH 802 interprets a frame as a well formed PSL_REQ with a matching DID value, the DH 802 sends a frame with a payload corresponding to parameter values provided in a PSL_RES message. For example, if the bit rate to be used for data exchange differs from the bit rate used for RF Discovery, the DH 802 sends a Data Packet (e.g., parameter update message) with a payload corresponding to a PSL_REQ, communicated at act 816 to NFCC 804. In an aspect, the value for DID in the PSL_REQ may be used for the parameter update message. Likewise, the values of DSI and DRI are set to the values to be used for data exchange. The value of a maximum frame length (FSL) is also defined.

Further, at act 818, once DH 802 receives a Data Packet that it interprets as a well formed parameter selection response (PSL_RES) with a matching DID value, DH 802 sends a parameter update message (e.g., RF_PARAMETER_UPDATE_CMD) to update the RF Communication parameter values in the NFCC 804. In the depicted aspect, the parameter update message includes both Transmit Bit Rate and Receive Bit Rate parameter values. If the selected bit rate changes in the RF Technology or Mode, the parameter update message includes a RF Technology and Mode parameter. Likewise, if the maximum payload size has changed, the parameter update message includes a Maximum Payload Size parameter. At act 820, the NFCC 804 implements the changes in the parameter values specified in the parameter update message.

In Poll Mode, if the bit rate to be used for data exchange is the same as the bit rate used for RF Discovery, the DH 802 does not send a PSL_REQ to the remote NFC endpoint. Further, if parameter values are not changed, communications do not use updated parameter values. At act 822, DEP request and response communications are transmitted between DH 802 and the remote NFC endpoint 806 through NFCC 804 using the updated parameter values.

Figure 9A:
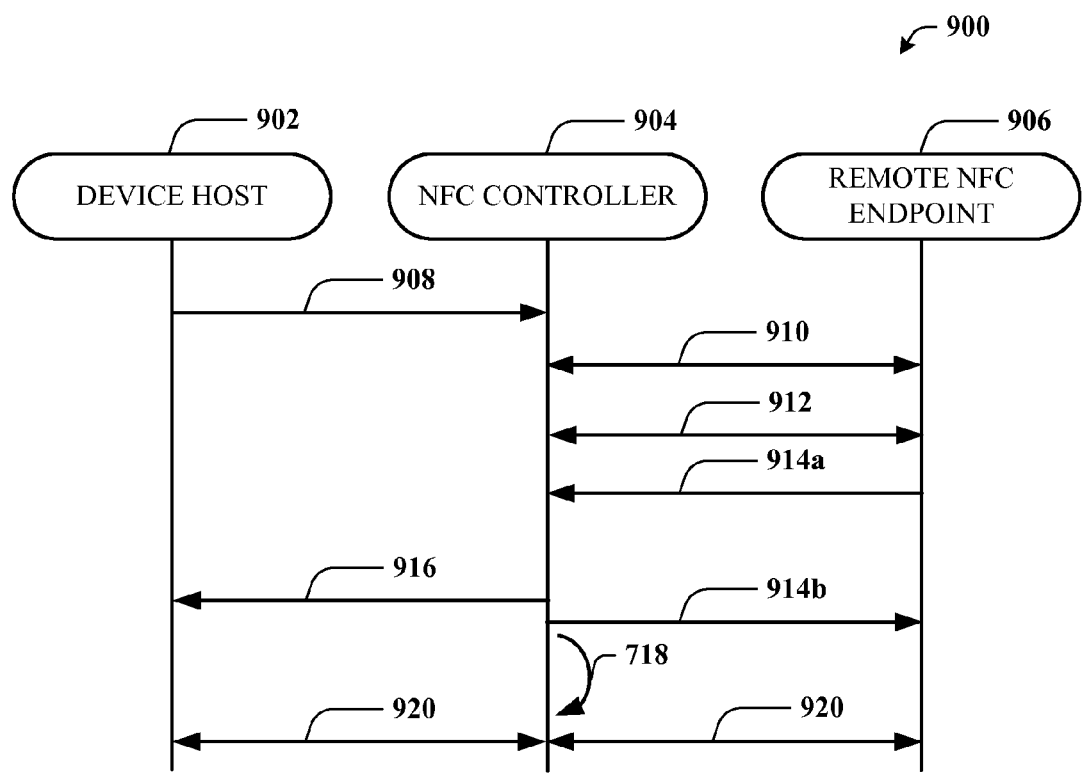
FIG. 9A is a call flow diagram describing an example for updating parameter values when a NFC-DEP interface is used and the DH is in a listening mode according to an aspect.
Figure 9B:
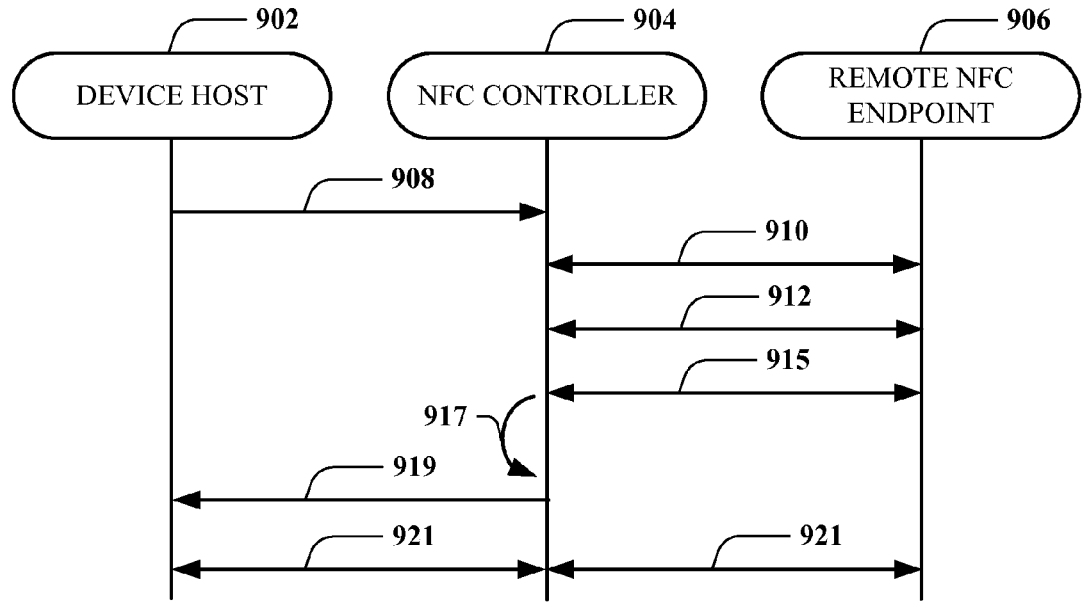
FIG. 9B is a call flow diagram describing an example for updating parameter values when a NFC-DEP interface is used and the DH is in a polling mode according to an aspect.

With reference now to FIGS. 9A and 9B, example call flow diagrams describing a system for updating parameter values for peer-to-peer communications between a DH and a remote NFC endpoint using a NFCC is illustrated. As depicted in FIGS. 9A and 9B, a NFC environment 900 may include a device 902, a NFCC 904 and a remote NFC endpoint 906. Device host 602 may be implemented in Poll Mode or Listening Mode. FIG. 9A depicts a DH is Listen Mode and FIG. 9B depicts a DH in Poll mode. Additionally, the aspects depicted in FIGS. 9A and 9B include use of a NFC-DEP interface by NFCC 904.

With reference to FIG. 9A, to enable Listen Mode, at act 908, the DH 902 sends a discovery message (e.g., RF_DISCOVER_CMD) to the NFCC 904 indicating that discovery for Listen Mode should start. At act 910, sense request and response messages may be communicated between NFCC 904 and the remote NFC endpoint 906. At act 912, attribute request and response messages may be communicated between NFCC 904 and the remote NFC endpoint 906.

Generally, when the NFCC 904 is ready to exchange data (e.g., after successful protocol activation), the NFCC 904 sends an activation notification (e.g., RF_ACTIVATE_NTF) to the DH 602 to indicate that the NFC-DEP protocol has been activated. In an aspect, activation may be indicated, following an anti-collision sequence, and when an ATR_REQ has been received from the remote NFC endpoint 906, the NFCC sends an attribute response (e.g., ATR_RES) to the remote NFC endpoint 906. In an aspect, ATR_RES_GEN_BYTES are configured during Discovery Configuration. Further after transmission of the attributes response, NFCC 904 waits for the arrival of the next command.

If, at act 914a, the next command from the remote NFC endpoint 906 is a DEP request (e.g., DEP_REQ), the NFCC forwards the ATR_REQ to the DH 902 within the Activation Parameter values (as described in Table 6) of the activation notification message (e.g., RF_ACTIVATE_NTF). Then at act 922, the NFCC 904 forwards the DEP_REQ to the DH 902 and DEP communications are set up between remote NFC endpoint 906 and DH 902. If, at act 914a, the command from the remote NFC endpoint is a parameter selection request (e.g., PSL_REQ), then at act 916, NFCC 904 forwards the ATR_REQ to the DH 902 within the Activation Parameter values (as described in Table 6) of the activation notification message (e.g., RF_ACTIVATE_NTF). In such an aspect, the Activation Parameter values indicate the bit rate and RF Technology and Mode settings according to the values in the PSL_REQ. At act, 914b, the NFCC then sends a PSL_RES to the Remote NFC Endpoint 906, and at act 918, NFCC 904 updates the RF Communication parameter values according to the values in the PSL_REQ. At act 920, DEP request and response communications are transmitted between DH 902 and the remote NFC endpoint 906 through NFCC 904 using the updated parameter values.

In an aspect, for NFC-A the RF_ACTIVATE_NTF includes the Activation Parameters defined in Table 6

TABLE 6

Activation Parameters for NFC-DEP (Listen Mode)

| Parameter | Length | Description |
| --- | --- | --- |
| ATR_REQ Command length | 1 byte | Length of ATR_REQ Command Parameter (n) |
| ATR_REQ Command | n bytes | Byte 3-Byte 16 + n of ATR_REQ Command |

With reference to FIG. 9B, to enable Poll Mode, at act 908, the DH 902 sends a discovery message (e.g., RF_DISCOVER_CMD) to the NFCC 904 indicating that discovery for Poll Mode should start. At act 910, sense request and response messages may be communicated between NFCC 904 and the remote NFC endpoint 906. At act 912, attribute request and response messages may be communicated between NFCC 904 and the remote NFC endpoint 906.

Generally, when the NFCC 904 is ready to exchange data (e.g., after successful protocol activation), the NFCC 904 sends an activation notification (e.g., RF_ACTIVATE_NTF) to the DH 602 to indicate that the NFC-DEP protocol has been activated. In an aspect, activation may be indicated, following an anti-collision sequence, and when an ATR_REQ has been received from the remote NFC endpoint 906 the NFCC sends an attribute response (e.g., ATR_RES) to the remote NFC endpoint 906. In an aspect, ATR_RES_GEN_BYTES are configured during Discovery Configuration. When an ATR_RES is received from the remote NFC endpoint 906, at act 915, and NFCC 904 determines not difference at act 917 between the current bit rate and any proposed bit rate, the NFCC forwards the ATR_RES to the DH, at act 919, within the Activation Parameters (as depicted n Table 7) of the RF_ACTIVATE_NTF to indicate that a Remote NFC Endpoint based on NFC-DEP has been activated.

TABLE 7

Activation Parameters for NFC-DEP (Poll Mode)

| Parameter | Length | Description |
| --- | --- | --- |
| ATR_RES Response length | 1 Byte | Length of ATR_RES Command Parameter (n) |
| ATR_RES Response | n Bytes | Byte 3-Byte 17 + n of ATR_RES Response |

At act 921, DEP request and response communications are transmitted between DH 902 and the remote NFC endpoint 906 through NFCC 904 using the updated parameter values.

Figure 10:
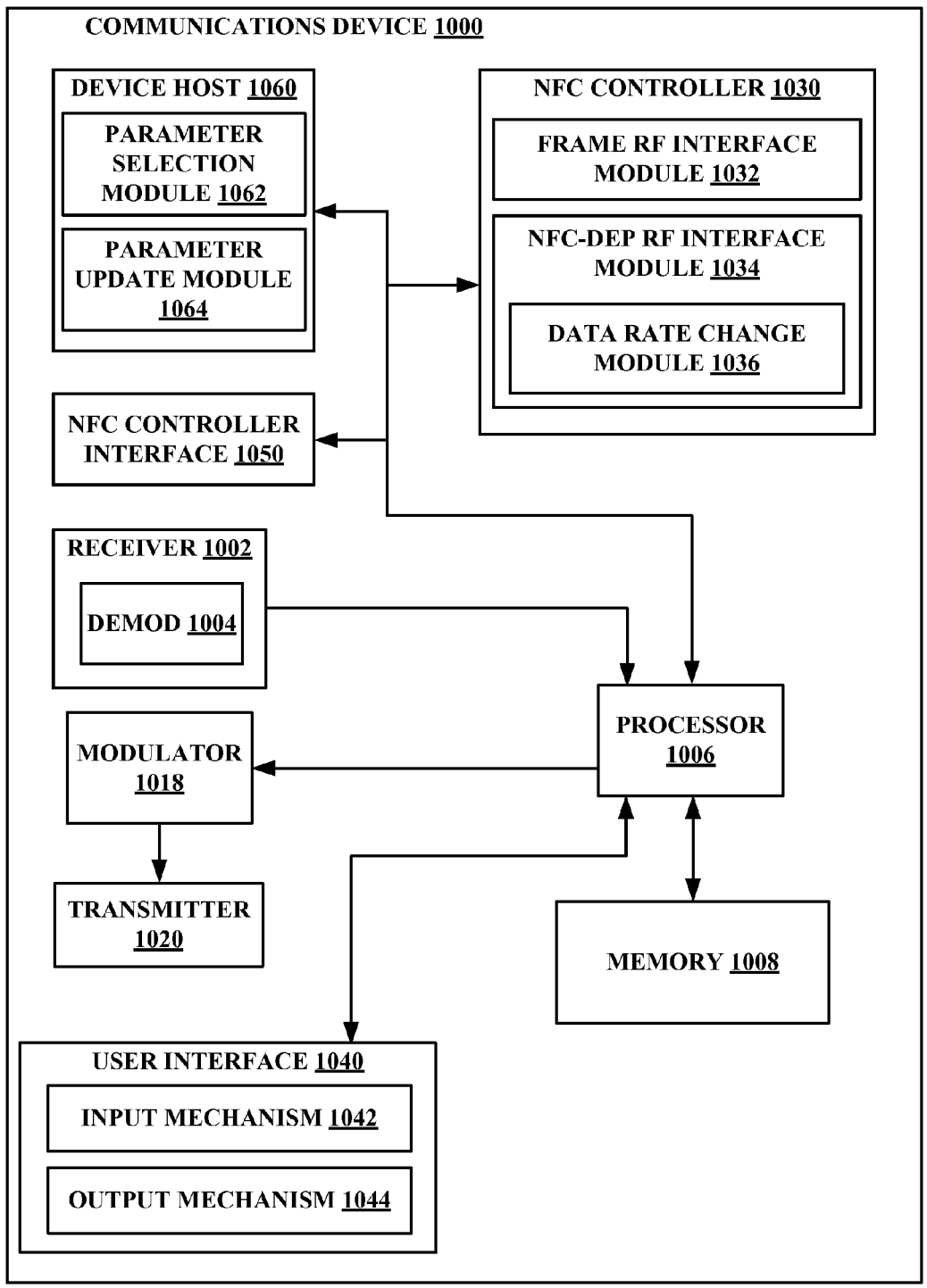
FIG. 10 is a functional block diagram of an example architecture of a communications device, according to an aspect.

While referencing FIG. 3, but turning also now to FIG. 10, an example architecture of communications device 1000 is illustrated. As depicted in FIG. 10, communications device 1000 comprises receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can comprise a demodulator 1004 that can demodulate received symbols and provide them to processor 1006 for channel estimation. Processor 1006 can be a processor dedicated to analyzing information received by receiver 1002 and/or generating information for transmission by transmitter 1020, a processor that controls one or more components of communications device 1000, and/or a processor that both analyzes information received by receiver 1002, generates information for transmission by transmitter 1020, and controls one or more components of communications device 1000. Further, signals may be prepared for transmission by transmitter 1020 through modulator 1018 which may modulate the signals processed by processor 1006.

Communications device 1000 can additionally include memory 1008 that is operatively coupled to processor 1006 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 1006 can provide means for determining, by a DH 1060, that one or more parameter values included in a parameter selection request message are different than one or more corresponding parameter values used during discovery of a peer target device 330 using a frame RF interface 1032, and means for communicating the one or more parameter values to a NFC Controller 1030 using a parameter update message, wherein the parameter update message prompts the NFC Controller 1030 to change the one or more corresponding parameter values used during discovery to the one or more parameter values included in the parameter selection request message.

Still further, processor 1006 can provide means for receiving, by a NFC Controller 1030 using a NFC data exchange protocol (NFC-DEP) interface 1034, a parameter selection request message including one or more parameters, means for determining to implement one or more parameter changes based on the received parameter selection request, and means for communicating an activation message to a DH 1060 indicating values to which the one or more parameter values were changed.

It will be appreciated that data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1008 of the subject systems and methods may comprise, without being limited to, these and any other suitable types of memory.

In another aspect, communications device 1000 may include NCI 1050. In an aspect, NCI 1050 may be configured to enable communications between a DH 1060 and NFC controller 1030.

Communications device 1000 may include a NFC controller 1030. In an aspect, NFC Controller 1030 may be configured to obtain, through NCI 1050, information from other devices, such as peer target device 330. During peer-to-peer communications NFC Controller 1030 may operate using a frame RF interface 314 or a NFC-DEP interface 1034. When operating using the NFC-DEP interface 1034, NFC Controller 1030 may be configured to change various parameter values associated with communications between device host 1060 and peer target device 330 using rate change module 1036. Communications device 1000 may further include device host 1060. Device host 1060 may include, among other modules, parameter selection module 1062 and parameter update module 1064.

In an operational aspect, when using a frame RF interface 1032, NFC Controller 1030 may act as a relay and merely communicate messages between communications device 1000 device host 1060 and peer target device 330. In such an aspect, NFC controller 1030 may not interpret the content of messages relayed between communications device 1000 device host 1060 and peer target device 330. In such an aspect, device host 1060 may determine that change for one or more parameters, such as a bit rate, may be requested through parameter selection module 1062. Parameter selection module 1062 may receive a parameter selection request (e.g., PSL_REQ) message from peer target device 330. Parameter update module 1064 may communicate a portion of parameter values obtained by parameter selection module 1062 to NFC Controller 1030. Further, communications from parameter update module 1064 may prompt NFC controller 1030 to change various parameters, such as receive and/or transmit data rates, bit rate, RF technology, buffer size, maximum payload size, etc.

In another operational aspect, when NFC-DEP interface 1034 is used to facilitate communications between communications device 1000 device host 1060 and peer target device 330, the NFC Controller 1030 may interpret the content of the messages being conveyed. In such an aspect, NFC Controller 1030. NFC Controller 1030 may determine whether rate change module 1036 may be used based on the presence or absence of a parameter selection message. When the device host 1060 is in a polling mode, the device host 1060 may transmit the parameter selection request message. When the device host 1060 is in a listening mode, NFC Controller 1030 may wait to determine whether a message received after an attribute message is a data exchange protocol (DEP) message or a parameter selection request message. When the message received is a parameter selection request message, NFC Controller 1030 may interpret the content of the message to determine whether parameter changes may be implemented using rate change module 1036.

Additionally, communications device 1000 may include user interface 1040. User interface 1040 may include input mechanisms 1042 for generating inputs into communications device 1000, and output mechanism 1044 for generating information for consumption by the user of the communications device 1000. For example, input mechanism 1042 may include a mechanism such as a key or keyboard, a mouse, a touch-screen display, a microphone, etc. Further, for example, output mechanism 1044 may include a display, an audio speaker, a haptic feedback mechanism, etc. In the illustrated aspects, the output mechanism 1044 may include a display configured to present media content that is in image or video format or an audio speaker to present media content that is in an audio format.

Figure 11:
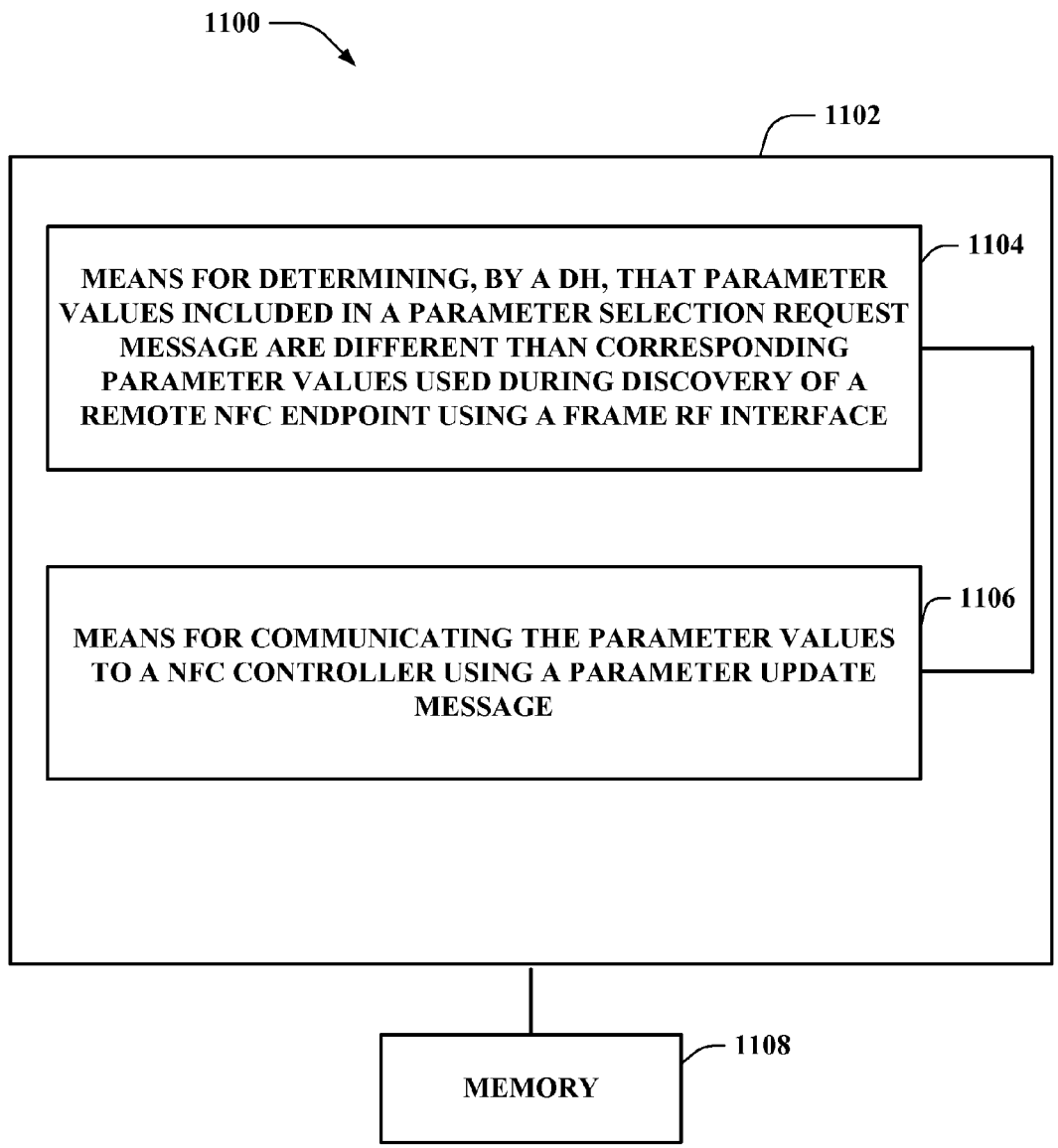
FIG. 11 is a block diagram of an example communication system for updating parameter values when a frame RF interface is used, according to an aspect.

FIG. 11 depicts another depicts a block diagram of an exemplary communication system 1100 operable to provide improved mechanisms for updating parameter values for communications between a DH and a remote NFC endpoint, according to an aspect. For example, system 1100 can reside at least partially within a communications device (e.g., communications device 1000). It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction.

For instance, logical grouping 1102 can include an electrical component that may provide means for determining, by a DH, that one or more parameter values included in a parameter selection request message are different than one or more corresponding parameter values used during discovery of a remote NFC endpoint using a frame RF interface 1104. In an aspect, where the DH is configured in a Poll mode, the means for determining 1104 may further include means for receiving an activation notification message from the NFC Controller, and means for generating the parameter selection request message to change the one or more corresponding parameter values used during discovery to the one or more parameter values included in a parameter selection request message. In such an aspect, the one or more parameter values included in a parameter selection request message may be different than the one or more corresponding parameter values used during discovery. In another aspect, the means for monitoring 1104 may further include means for monitoring a signal strength value of the first RAT at a first time and a second time after the first time. In another aspect, wherein the DH is configured in a Listen Mode, the means for determining 1104 may further include means for receiving the parameter selection request message from the remote NFC endpoint. In an aspect, parameter values may include a RF technology and mode parameter, a transmit bit rate parameter, a receive bit rate parameter, a maximum payload size parameter, etc. Further, in such an aspect, the RF technology and mode parameter may indicate use of a NFC-A technology, a NFC-B technology, a NFC-F technology, etc. In aspect, the remote NFC endpoint may be a peer NFC device, a reader device, a writer device, a remote NFC tag, a NFC card, etc.

Moreover, logical grouping 1102 can include an electrical component that may provide means for communicating the one or more parameter values to a NFC Controller using a parameter update message 1106. In an aspect, the parameter update message may prompt the NFC Controller to change the one or more corresponding parameter values used during discovery to the one or more parameter values included in the parameter selection request message. In another aspect, the means for communicating 1106 may include means for transmitting a payload to the remote NFC endpoint using a data exchanging protocol using at least one of the one or more parameter values.

Additionally, system 1100 can include a memory 1108 that retains instructions for executing functions associated with the electrical components 1104 and 1106, stores data used or obtained by the electrical components 1104, 1106, etc. While shown as being external to memory 1108, it is to be understood that one or more of the electrical components 1104 and 1106 may exist within memory 1108. In one example, electrical components 1104 and 1106 can include at least one processor, or each electrical component 1104 and 1106 can be a corresponding module of at least one processor. Moreover, in an additional or alternative example, electrical components 1104 and 1106 may be a computer program product including a computer readable medium, where each electrical component 1104 and 1106 may be corresponding code.

Figure 12:
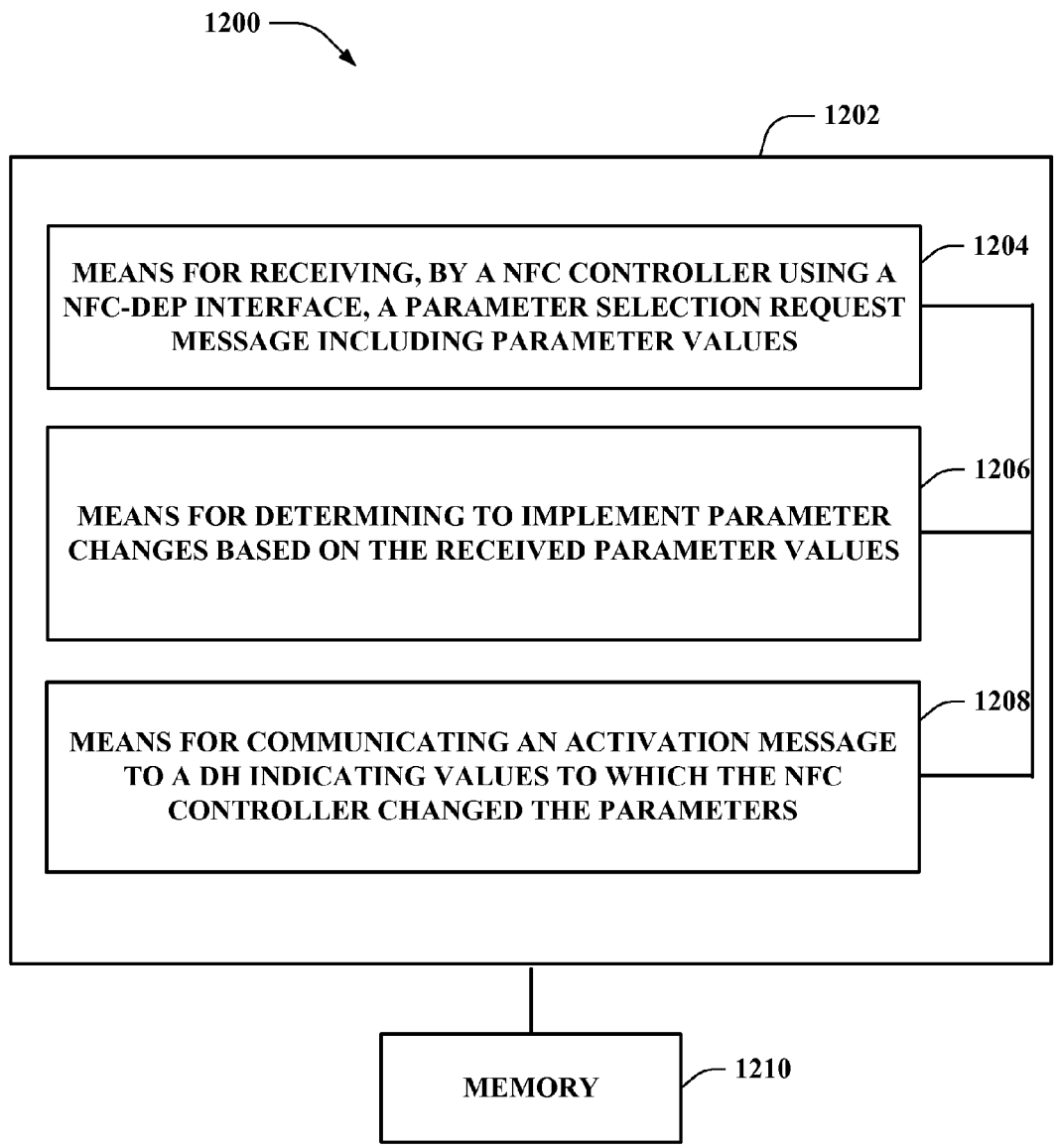
FIG. 12 is a block diagram of an example communication system for updating parameter values when a NFC-DEP interface is used, according to an aspect.

FIG. 12 depicts another depicts a block diagram of an exemplary communication system 1200 operable to provide improved mechanisms for updating parameter values for communications between a DH and a remote NFC endpoint, according to an aspect. For example, system 1200 can reside at least partially within a communications device (e.g., communications device 1000). It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction.

For instance, logical grouping 1202 can include an electrical component that may provide means for receiving, by a NFC Controller using a NFC-DEP interface, a parameter selection request message including one or more parameter values 1208. In an aspect, the means for receiving 1204 may include means for receiving the parameter selection request message from a DH when the DH is configured in a Poll Mode. In an aspect, the means for modifying 1204 may include means for decreasing the interval between polling modes based on the monitored signal strength. In an aspect, the parameter values may include a RF technology and mode parameter, a transmit bit rate parameter, a receive bit rate parameter, a maximum payload size parameter, etc. Further, in such an aspect, the RF technology and mode parameter may indicate use of a NFC-A technology, a NFC-B technology, a NFC-F technology, etc.

Further, logical grouping 1202 can include an electrical component that may provide means for determining to implement one or more parameter changes based on the received one or more parameter values 1206. In an aspect, where a DH is configured in a Listen mode, the means for determining 1206 may include means for receiving attributes from a remote NFC endpoint, means for waiting for a message to be communicated by the remote NFC endpoint after the attributes, means for receiving the waited for message, means for determining the waited for message is the parameter selection request message, means for communicating an activation message to the DH including the one or more parameter values and means for transmitting a parameter selection response to the remote NFC endpoint. In an aspect, the remote NFC endpoint may be a peer NFC device, a reader device, a writer device, a tag, a card, etc.

Moreover, logical grouping 1202 can include an electrical component that may provide means for communicating an activation message to a DH indicating values to which the NFC Controller changed the one or more parameter values 1208. In an aspect, the means for communicating 1208 may include means for transmitting a payload to the remote NFC endpoint using the NFC-DEP interface and using at least one of the one or more parameter values.

Additionally, system 1200 can include a memory 1210 that retains instructions for executing functions associated with the electrical components 1204, 1206, and 1208, stores data used or obtained by the electrical components 1204, 1206, 1208, etc. While shown as being external to memory 1210, it is to be understood that one or more of the electrical components 1204, 1206, and 1208 may exist within memory 1210. In one example, electrical components 1204, 1206, and 1208 can include at least one processor, or each electrical component 1204, 1206, and 1208 can be a corresponding module of at least one processor. Moreover, in an additional or alternative example, electrical components 1204, 1206, and 1208 may be a computer program product including a computer readable medium, where each electrical component 1204, 1206, and 1208 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communications device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC, -f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
   determining, by a device host (DH), that one or more parameter values included in a parameter selection request message are different than one or more corresponding parameter values used during discovery of a remote Near Field Communication (NFC) endpoint using a frame radio frequency (RF) interface; and
   communicating the one or more parameter values to a NFC Controller using a parameter update message, wherein the parameter update message prompts the NFC Controller to change the one or more corresponding parameter values used during discovery to the one or more parameter values included in the parameter selection request message.

2. The method of claim 1, wherein the DH is configured in a Poll Mode, and wherein the determining further comprises:
   receiving an activation notification message from the NFC Controller; and
   generating the parameter selection request message to change the one or more corresponding parameter values used during discovery to the one or more parameter values included in the parameter selection request message, where the one or more parameter values included in the parameter selection request message are different than the one or more corresponding parameter values used during discovery.

3. The method of claim 1, wherein the DH is configured in a Listen Mode, and further comprising:
receiving the parameter selection request message from the remote NFC endpoint.

4. The method of claim 1, further comprising:
transmitting a payload to the remote NFC endpoint using a data exchanging protocol using at least one of the one or more parameter values.

5. The method of claim 1, wherein the one or more parameter values include at least one value for a parameter from among:
a RF technology and mode parameter;
a transmit bit rate parameter;
a receive bit rate parameter; and
a maximum payload size parameter.

6. The method of claim 5, wherein the RF technology and mode parameter indicates a technology among: a NFC-A technology, a NFC-B technology, and a NFC-F technology.

7. The method of claim 1, wherein the remote NFC endpoint includes one device from among: a peer NFC device, a reader device, a writer device, a remote NFC tag, and a NFC card.

8. A computer program product, comprising:
a non-transitory computer-readable medium comprising code for causing a computer to:
determine, by a device host (DH), that one or more parameter values included in a parameter selection request message are different than one or more corresponding parameter values used during discovery of a remote Near Field Communication (NFC) endpoint using a frame radio frequency (RF) interface; and
communicate the one or more parameter values to a NFC Controller using a parameter update message, wherein the parameter update message prompts the NFC Controller to change the one or more corresponding parameter values used during discovery to the one or more parameter values included in the parameter selection request message.

9. The computer program product of claim 8, wherein the DH is configured in a Poll Mode, and wherein the non-transitory computer-readable medium further comprises code for causing the computer to:
receive an activation notification message from the NFC Controller; and
generate the parameter selection request message to change the one or more corresponding parameter values used during discovery to the one or more parameter values included in the parameter selection request message, where the one or more parameter values included in the parameter selection request message are different than the one or more corresponding parameter values used during discovery.

10. The computer program product of claim 8, wherein the DH is configured in a Listen Mode, and wherein the non-transitory computer-readable medium further comprises code for causing the computer to:
receive the parameter selection request message from the remote NFC endpoint.

11. The computer program product of claim 8, wherein the non-transitory computer-readable medium further comprises code for causing the computer to:
communicate a payload using a data exchanging protocol using at least one of the one or more parameter values.

12. The computer program product of claim 8, wherein the one or more parameter values include at least one value for a parameter from among:
a RF technology and mode parameter;
a transmit bit rate parameter;
a receive bit rate parameter; and
a maximum payload size parameter.

13. The computer program product of claim 12, wherein the RF technology and mode parameter indicates a technology among: a NFC-A technology, a NFC-B technology, and a NFC-F technology.

14. The computer program product of claim 8, wherein the remote NFC endpoint includes one device from among: a peer NFC device, a reader device, a writer device, a remote NFC tag, and a NFC card.

15. An apparatus for communications, comprising:
means for determining, by a device host (DH), that one or more parameter values included in a parameter selection request message are different than one or more corresponding parameter values used during discovery of a remote Near Field Communication (NFC) endpoint using a frame radio frequency (RF) interface; and
means for communicating the one or more parameter values to a NFC Controller using a parameter update message, wherein the parameter update message prompts the NFC Controller to change the one or more corresponding parameter values used during discovery to the one or more parameter values included in the parameter selection request message.

16. The apparatus of claim 15, wherein the DH is configured in a Poll Mode, and wherein the means for determining further comprises:
means for receiving an activation notification message from the NFC Controller; and
means for generating the parameter selection request message to change the one or more corresponding parameter values used during discovery to the one or more parameter values included in the parameter selection request message, where the one or more parameter values included in the parameter selection request message are different than the one or more corresponding parameter values used during discovery.

17. The apparatus of claim 15, wherein the DH is configured in a Listen Mode, and further comprising:
means for receiving the parameter selection request message from the remote NFC endpoint.

18. The apparatus of claim 15, further comprising:
means for transmitting a payload to the remote NFC endpoint using a data exchanging protocol using at least one of the one or more parameter values.

19. The apparatus of claim 15, wherein the one or more parameter values include at least one value for a parameter from among:
a RF technology and mode parameter;
a transmit bit rate parameter;
a receive bit rate parameter; and
a maximum payload size parameter.

20. The apparatus of claim 19, wherein the RF technology and mode parameter indicates a technology among: a NFC-A technology, a NFC-B technology, or a NFC-F technology.

21. The apparatus of claim 15, wherein the remote NFC endpoint includes one device from among: a peer NFC device, a reader device, a writer device, a remote NFC tag, and a NFC card.

22. An apparatus for communications, comprising:
a device host (DH) configured to:
determine that one or more parameter values included in a parameter selection request message are different than one or more corresponding parameter values used during discovery of a remote Near Field Communication (NFC) endpoint using a frame radio frequency (RF) interface; and
communicate the one or more parameter values to a NFC Controller using a parameter update message, wherein the parameter update message prompts the NFC Controller to change the one or more corresponding parameter values used during discovery to the one or more parameter values included in the parameter selection request message.

23. The apparatus of claim 22, wherein the DH is configured in a Poll Mode, and wherein the DH is further configured to:
receive an activation notification message from the NFC Controller; and
generate the parameter selection request message to change the one or more corresponding parameter values used during discovery to the one or more parameter values included in the parameter selection request message, where the one or more parameter values included in the parameter selection request message are different than the one or more corresponding parameter values used during discovery.

24. The apparatus of claim 22, wherein the DH is configured in a Listen Mode, and wherein the DH is further configured to:
receive the parameter selection request message from the remote NFC endpoint.

25. The apparatus of claim 22, wherein the DH is further configured to:
transmit a payload to the remote NFC endpoint using a data exchanging protocol using at least one of the one or more parameter values.

26. The apparatus of claim 22, wherein the one or more parameter values include at least one value for a parameter from among:
a RF technology and mode parameter;
a transmit bit rate parameter;
a receive bit rate parameter; and
a maximum payload size parameter.

27. The apparatus of claim 26, wherein the RF technology and mode parameter indicates a technology among: a NFC-A technology, a NFC-B technology, or a NFC-F technology.

28. The apparatus of claim 22, wherein the remote NFC endpoint includes one device from among: a peer NFC device, a reader device, a writer device, a remote NFC tag, and a NFC card.

* * * * *